(12) United States Patent
Lundstrom et al.

(10) Patent No.: US 11,965,586 B2
(45) Date of Patent: Apr. 23, 2024

(54) ELECTROMECHANICAL ACTUATOR

(71) Applicant: BorgWarner Sweden AB, Landskrona (SE)

(72) Inventors: Bo Lundstrom, Glumslov (SE); Lars Severinsson, Hishult (SE)

(73) Assignee: BORGWARNER SWEDEN AB (SE)

( * ) Notice: Subject to any disclaimer, the term of this patent is extended or adjusted under 35 U.S.C. 154(b) by 26 days.

(21) Appl. No.: 16/964,808

(22) PCT Filed: Jan. 25, 2019

(86) PCT No.: PCT/EP2019/051832
§ 371 (c)(1),
(2) Date: Jul. 24, 2020

(87) PCT Pub. No.: WO2019/145465
PCT Pub. Date: Aug. 1, 2019

(65) Prior Publication Data
US 2021/0033184 A1    Feb. 4, 2021

(30) Foreign Application Priority Data

Jan. 25, 2018 (SE) .................................. 1850084-3
Apr. 13, 2018 (SE) .................................. 1850419-1

(51) Int. Cl.
*F16H 48/22* (2006.01)
*F16D 28/00* (2006.01)
(Continued)

(52) U.S. Cl.
CPC ............. *F16H 48/22* (2013.01); *F16D 28/00* (2013.01); *F16H 48/34* (2013.01);
(Continued)

(58) Field of Classification Search
CPC ............... F16D 2023/123; F16D 28/00; F16D 2121/24; F16D 2125/36; F16D 2125/48;
(Continued)

(56) References Cited

U.S. PATENT DOCUMENTS 3,579,066 A * 5/1971 Bearfield ............. H02K 7/1023
188/163
5,103,941 A * 4/1992 Vranish .................. F16D 49/00
188/82.9
(Continued)

FOREIGN PATENT DOCUMENTS

CN    1139628 A    1/1997
CN    1213049 A    4/1999
(Continued)

OTHER PUBLICATIONS

International Search Report dated May 8, 2019, International Application No. PCT/EP2019/051832.
(Continued)

*Primary Examiner* — Jacob S. Scott
*Assistant Examiner* — Farhana Pervin
(74) *Attorney, Agent, or Firm* — Dilworth IP, LLC (57) ABSTRACT

An electromechanical actuator (100) is provided. The actuator comprises an electrical motor (110) controlling a ball ramp mechanism. The ball ramp mechanism is configured to allow for mutual rotation of a first and second rotational member (120, 30) up to a first torque of the electrical motor (110), and to allow for axial separation of the first and second rotational members (120, 130) at a second torque of the electrical motor (110).

22 Claims, 5 Drawing Sheets

(51) Int. Cl.
*F16H 48/34* (2012.01)
*F16D 121/24* (2012.01)
*F16D 125/36* (2012.01)
*F16D 125/48* (2012.01)
*F16D 125/52* (2012.01)
*F16D 125/58* (2012.01)

(52) U.S. Cl.
CPC ...... *F16D 2121/24* (2013.01); *F16D 2125/36* (2013.01); *F16D 2125/48* (2013.01); *F16D 2125/52* (2013.01); *F16D 2125/582* (2013.01)

(58) Field of Classification Search
CPC ........... F16D 2125/52; F16D 2125/582; B60K 17/35; F16H 48/22; F16H 48/34; B60Y 2400/405
USPC ........................................................ 192/84.6
See application file for complete search history.

(56) References Cited

U.S. PATENT DOCUMENTS

| | | | | |
|---|---|---|---|---|
| 5,885,183 | A * | 3/1999 | Pritchard | B60K 17/346 475/206 |
| 6,637,569 | B1 | 10/2003 | Organek et al. | |
| 7,694,598 | B2 * | 4/2010 | Krieberneg | B60K 17/344 74/337.5 |
| 8,770,353 | B2 * | 7/2014 | Usui | F16D 65/18 188/72.7 |
| 8,771,128 | B2 | 7/2014 | Ekonen et al. | |
| 10,464,415 | B2 * | 11/2019 | Sharma | B60K 17/3467 |
| 2004/0192487 | A1 | 9/2004 | Teraoka | |
| 2006/0011441 | A1 | 1/2006 | Showalter | |
| 2009/0260945 | A1 | 10/2009 | Martini et al. | |
| 2011/0039652 | A1 | 2/2011 | Ekonen et al. | |
| 2012/0080275 | A1 * | 4/2012 | Usui | F16D 65/18 74/89 |
| 2013/0118853 | A1 * | 5/2013 | Champalou | F16H 55/36 192/56.62 |
| 2015/0300418 | A1 * | 10/2015 | Averill | F16D 28/00 477/13 |
| 2016/0176407 | A1 | 6/2016 | Sharma et al. | |
| 2017/0122434 | A1 | 5/2017 | Imafuku | |
| 2017/0184170 | A1 | 6/2017 | Finney | |
| 2018/0080508 | A1 * | 3/2018 | Nahrwold | F16D 28/00 |

FOREIGN PATENT DOCUMENTS

| | | | | |
|---|---|---|---|---|
| CN | 103051075 A | | 4/2013 | |
| DE | 102010039443 A1 | | 2/2012 | |
| JP | 2012077807 A | | 4/2012 | |
| JP | WO 2014091621 | * | 6/2014 | ......... B60K 17/3462 |
| WO | 2007131616 A2 | | 11/2007 | |
| WO | 2008030340 A2 | | 3/2008 | |
| WO | 2014091621 A1 | | 6/2014 | |
| WO | 2019145465 A1 | | 8/2019 | |

OTHER PUBLICATIONS

Chinese Office Action including search report dated Feb. 18, 2023; Application No. 201980006807.7; Applicant: BorgWarner Sweden Ltd; 8 pages.

\* cited by examiner

ELECTROMECHANICAL ACTUATOR

This application claims the benefit of Swedish Application No. 1850084-3 filed Jan. 1, 2018, Swedish Application No. 1850419-1 filed Apr. 13, 2018, and PCT Application No. EP2019/051832 filed Jan. 25, 2019.

TECHNICAL FIELD

The present invention relates to the field of torque distributing devices, or more specifically to an electromechanical actuator for torque distribution couplings.

BACKGROUND

As of today, many cars are equipped with all-wheel drive (AWD) systems as such systems offer superior handling capabilities and driving safety. It is however a known problem that having a constantly active AWD-system may reduce the performance of the vehicle in terms of fuel efficiency or, in case of electric/hybrid vehicles, cause a reduction in the range of the batteries; this is of course not ideal. To solve this problem, the industry has developed AWD-systems where the driving torque to one wheel pair can be connected and disconnected such that AWD is only present when it is actually necessary given the current driving conditions, or by choice from the user of the vehicle. Often this is achieved by a coupling arranged in the drive train between the front and rear wheel pair. Such couplings are typically complex devices comprising a wet clutch or other components of similar function to selectively switch between two-wheel drive and AWD.

In modern vehicles additional control of components may be desired, once the all wheel drive functionality has been added by means of the AWD coupling. For example, the car manufacturer requires a disconnect for selectively disconnecting rotating parts from the drive train, or e.g. a switching mechanism for changing between high range or low range in the all wheel drive mode.

Although efforts have been made to provide an actuator capable of dual function, these solutions are so far rather complex. There is therefore a need for a more simple dual function actuator.

SUMMARY

It is an object of the invention to provide an improved electromechanical actuator which can alleviate some of the problems with prior art. Another advantage of the present invention relates to noise levels. Modern cars tend to be either hybrids having one or more electric motor and a combustion engine, or even purely electric vehicles. For instance, during electric drive, the car is considerably quieter than if a combustion engine is running; therefore any noise produced by the drive train will be conceived as louder, and possibly disturbing, by the persons in the car. Consequently the noise level is becoming an increasingly more important aspect during the development of components for automotive drive trains; the actuator described herein effectively reduces noise levels.

The actuator is able to control, using a single electric motor, not only an AWD state of the vehicle it is connected to, but also a position of a switching mechanism which can be used to alter for instance a gear ratio or to connect/disconnect an electric motor from the drive train.

In a first aspect, an electromechanical actuator is provided comprising an electrical motor, a first rotational member being in driving connection with the electrical motor, a second rotational member being connected to the first rotational member by means of a plurality of rolling elements such that the first rotational member and the second rotational member together form a ball ramp mechanism. A return spring is provided pressing the first and second rotational members towards each other. The ball ramp mechanism is configured to allow for mutual rotation of the first and second rotational member up to a first torque of the electrical motor, and to allow for axial separation of the first and second rotational members at a second torque of the electrical motor. Thus is an actuator achieved which provides dual functionalities in the mutual rotation and axial separation respectively, as well as reducing the noise level during actuation by the utilization of a ball ramp mechanism.

In an embodiment, the plurality of rolling elements are interposed between the first and second rotational members on a cam surface defined in at least one of the first or second rotational members. The cam surface allows the first and second rotational members with the rolling elements to rotate as a unit, as well accomplish axial separation.

The cam surface may comprise a number of arc shaped depressions, each having a first inclination, and a second inclination, where the first inclination is larger than the second inclination. The varying inclination of the cam surface, given a certain spring strength, provides a certain torque profile which is required for on one hand rotation of the first rotational member and the second rotational member as a unit and on the other hand mutual rotation between the first rotational member and the second rotational member.

In one embodiment, an indentation is arranged centrally in each arc shaped depression, the indentation defining the first inclination from the indentation and up to the arc shaped depression, and the second inclination is arranged in an upward direction on each side of the indentation. As long as the rolling elements are arranged in the indentations, they will be subjected to the first inclination requiring a second torque level to accomplish relative rotation, and thus axial separation, between the first and second rotational members. Consequently is the actuator rotated as a unit as long as the torque provided by the electric motor is below that threshold. When relative motion is accomplished by provision of the second torque which forces the rolling elements out of the indentations, they are instead subjected to the second inclination which is less steep requiring less torque for relative movement of the first and second cam member. Also, the smaller inclination means increased accuracy of the axial separation control during actuation. This could be beneficial for instance in limited slip couplings.

The first inclination may be in the range of 20° to 30°, preferably approximately 23,5°, and the second inclination may be in the range of 2° to 6°, preferably approximately 3,7°.

In an embodiment, the electrical motor may be in driving engagement with the first rotational member through a worm gear.

The worm gear may in one embodiment be a self-locking worm gear. The position of the actuator is in this way maintained even if power is removed from the electric motor, which for instance could be used to provide a park lock functionality to the coupling.

The electrical motor may further be in driving engagement with the first rotational member by means of spur gears.

In one embodiment, the electrical motor comprises a solenoid brake for maintaining the position of the first rotational member. The solenoid brake may for instance provide park lock functionalities, maintaining position of the actuator even no power is provided.

In one embodiment, mutual rotation of the first and second rotational member is configured to control the position of a switching mechanism and axial separation of the first and second rotational members is configured to control actuation of an all wheel drive clutch.

In one embodiment, mutual rotation of the first and second rotational member is configured to control actuation of a disconnect clutch, and axial separation of the first and second rotational members is configured to control actuation of an all wheel drive clutch.

The second rotational member may comprise gear teeth on its exterior circumference which are in engagement with gear teeth on a nut of the switching mechanism or of the disconnect clutch.

In one embodiment, the nut is axially moveable by rotation for controlling a position of the disconnect clutch. By being able to disconnect components of the power train when not in use, losses which occur when passive parts are rotated in the power train is avoided.

In one embodiment, the nut controls an axial position of a shift fork.

In one embodiment, the return spring is arranged to bias the all wheel drive clutch into a disengaged state.

In one embodiment, the electrical motor is provided with a position sensor being configured to determine the position of the ball ramp mechanism which facilitates control of the state of the actuator.

In a second aspect, a transfer case is provided comprising an all wheel drive clutch, a switching mechanism, and an electromechanical actuator according to the first aspect. A transfer case is thus provided, which can be controlled by a single electric motor and provide dual functionalities while reducing the emitted noise level during actuation. A further benefit is the reduction of active components in the transfer case, as only one electric motor is necessary.

In a third aspect, an all wheel drive transmission is provided, comprising an electrical drive motor, an all wheel drive clutch, a disconnect clutch, and an electromechanical actuator according to the first aspect. The all wheel drive transmission allows selection between two wheel drive and all wheel drive as well as the engagement/disengagement of an electrical drive motor, all by only using one electric motor for controlling the actuator.

In a fourth aspect, a vehicle is provided comprising a transfer case of the second aspect and/or an all wheel drive transmission according to the third aspect.

In a fifth aspect of the teachings herein, a method is provided for controlling torque distribution in a vehicle by means of an electromechanical actuator according to the first aspect. The method comprises: receiving a first input of a desired all wheel drive state for the vehicle and a second input of a desired state of an associated switching mechanism, if the desired state of the switching mechanism is different from the current state, applying a first torque by the electrical motor until the desired state is achieved, and if all wheel drive is desired, applying a second torque by the electrical motor until all wheel drive is achieved. The second torque being greater than the first torque.

The first torque may be in the range of 30% to 50% percent of maximum motor torque, preferably approximately 40%, and wherein the second torque may be in the range of 55% to 75% of maximum motor torque, preferably approximately 65%.

BRIEF DESCRIPTION OF DRAWINGS

The invention will be described in further detail below under reference to the accompanying drawings, in which.

DETAILED DESCRIPTION

The disclosed embodiments will now be described more fully hereinafter with reference to the accompanying drawings, in which certain embodiments of the invention are shown. Like numbers refer to like elements throughout.

Figure 1:
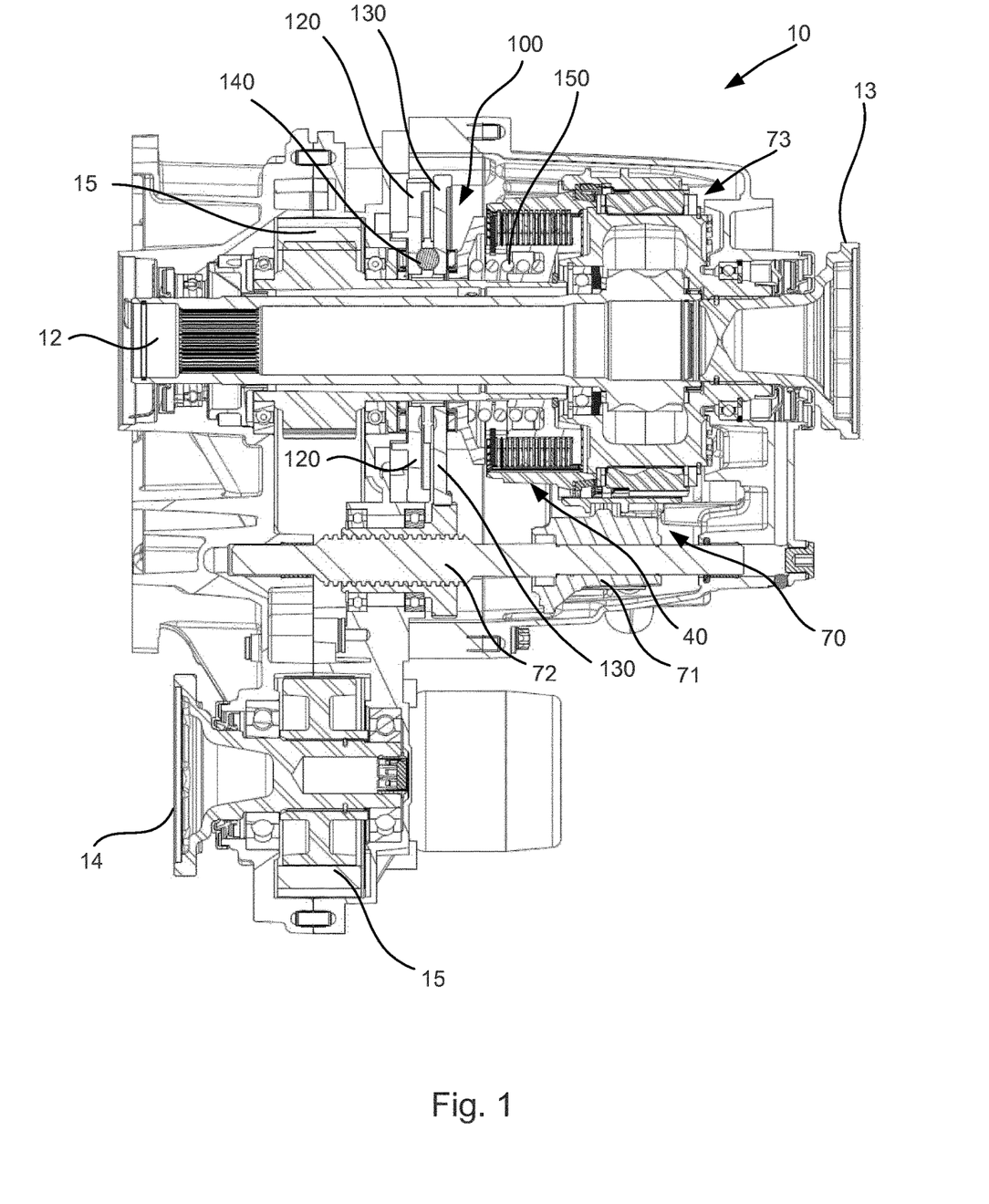
FIG. 1 is a cross-sectional view of a transfer case according to one embodiment.

FIG. 1 shows a transfer case 10 according to one embodiment. Typically, the transfer case 10 is used to shift between all wheel drive mode and two wheel drive mode of a vehicle. The transfer case 10 is typically arranged on the propeller shaft between a front and rear wheel pair of the vehicle, thus selectively transferring drive torque to the front and rear wheel pair depending on desired drive mode.

For instance, some vehicles are driven mainly by the rear wheels with the option of also driving the front wheels, and some are oppositely configured, i.e. normally front wheel driven but with the option of providing torque to the rear wheels as well. The teachings herein are applicable to either of these types of drive systems.

The transfer case 10 comprises an input shaft 12, receiving drive torque from a propulsion unit (not shown), and an output shaft 13 connecting to a rear axle of the vehicle. The propulsion unit is preferably the main power source of the vehicle, such as a combustion engine, an electric motor, or a combination thereof.

The input shaft 12 is connectable to a secondary output shaft 14 via an all wheel drive coupling 40, such that the coupling 40 can control the amount of torque that is transferred by a limited amount of slip between clutch discs if needed. The secondary output shaft 14 is preferably connected to a front axle of the vehicle, and receives rotary motion by means of a belt drive 15, arranged downstream the coupling 40.

In order to actuate the coupling 40 an electromechanical actuator 100 is provided. The electromechanical actuator 100 comprises an electrical motor 110 (shown in FIG. 2). The actuator 100 is preferably arranged such that it shares rotational axis with the input shaft 12 and/or the output shaft 13. The electrical motor 110 is preferably a brushless or a brushed DC electrical motor, however other types of electrical motors are also envisioned. For instance, synchronous motors or step motors could also be used. The electrical motor 9 comprises a position sensor 118 for determining a current position of the actuator 100. The actuator 100 is configured to control a disconnect/connect-state of the coupling 40, i.e. an AWD-state, as well as a position of a switching mechanism 70. The actuator 100 is thus of dual functionality, as it not only controls AWD but also the switching mechanism 70. As will be further explained below, the switching mechanism 70 could for instance control a gear range selection of a planetary gearing 73, and/or connection/disconnection of an electric motor 63 (shown in FIG. 8).

The actuator 100 comprises a first rotational member 120 and a second rotational member 130. The first rotational member 120 is essentially disc shaped and is configured to be in engagement with the electrical motor 110, through a gearing of either a regular spur or helical type or of a worm gear type. For this purpose, the first rotational member 120 comprises external gear teeth 122 on its circumference which are adapted for engagement with a pinion gear or worm gear connected either directly or by further gearing to the electrical motor 110.

The electrical motor 110 thus controls the rotation of the first rotational member 120, which as mentioned preferably shares the rotational axis with the input shaft 12 and/or the output shaft 13. As it may be desired that no power is needed to maintain the position of the first rotational member 120, the worm gear may be self-locking. For the embodiment where spur gears or helical gears are used to drive the first rotational member 120, a solenoid brake 118 may be provided at the electrical motor 110 to serve the same purpose. This may further serve as a park lock function of the vehicle, which provides an advantageous effect to the dual function actuator.

Figures 2, 3, 4:
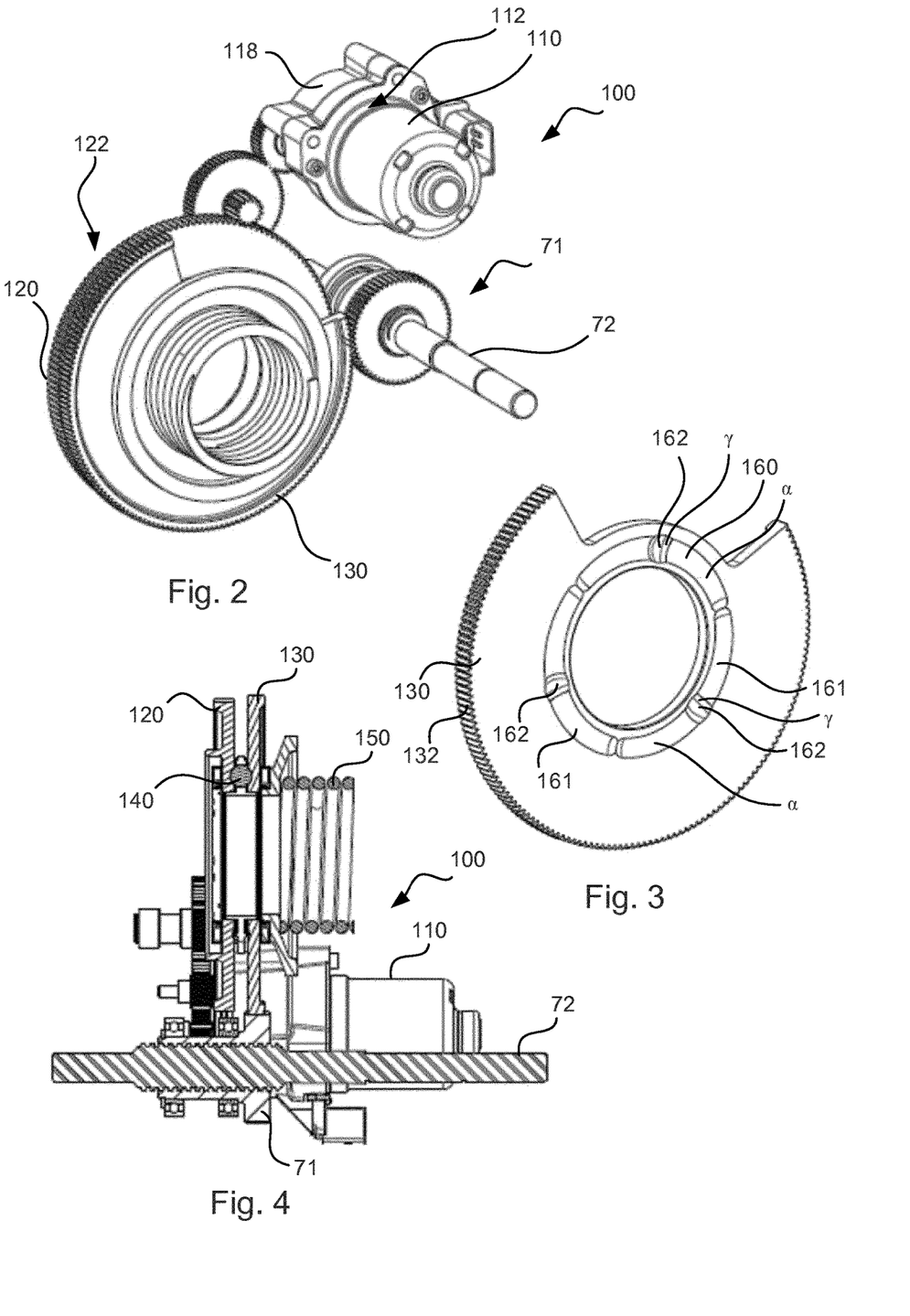
FIG. 2 is an isometric view of an actuator according to an embodiment.
FIG. 3 is an isometric view of a rotational member of the actuator shown in FIG. 2.
FIG. 4 is a cross-sectional view of the actuator shown in FIG. 2.

Between the first rotational member 120 and the second rotational member 130 a plurality of rolling elements 140 are arranged, preferably balls or rollers. The rolling elements 140 are configured to roll in a cam surface 160, as seen in FIG. 3, which results in that the second rotational member 130 is moved axially when the first and second rotational members 120, 130 are rotated in relation to one another. The second rotational member 130 is, similar to the first rotational member 120, preferably disc shaped however it may not necessarily be a complete circular disc. As is shown in FIGS. 2 and 3 a semi-circular shape is sufficient as it does not have to perform complete revolutions. By its axial motion toward the coupling 40 the second rotational member 130 is configured to control the compression of the coupling 40, bringing the discs of the coupling 40 together such that connection is made between the input shaft 12 and the secondary output shaft 14 of the transfer case 10. A return spring 150 is provided at the actuator 100 for disengaging the coupling 40, moving the second rotational member 130 axially away from the coupling 40 and for maintaining pressure on the actuator 100, i.e. keeping the second rotational member 130 pressed against the first rotational member 120.

Figures 5, 6, 7:
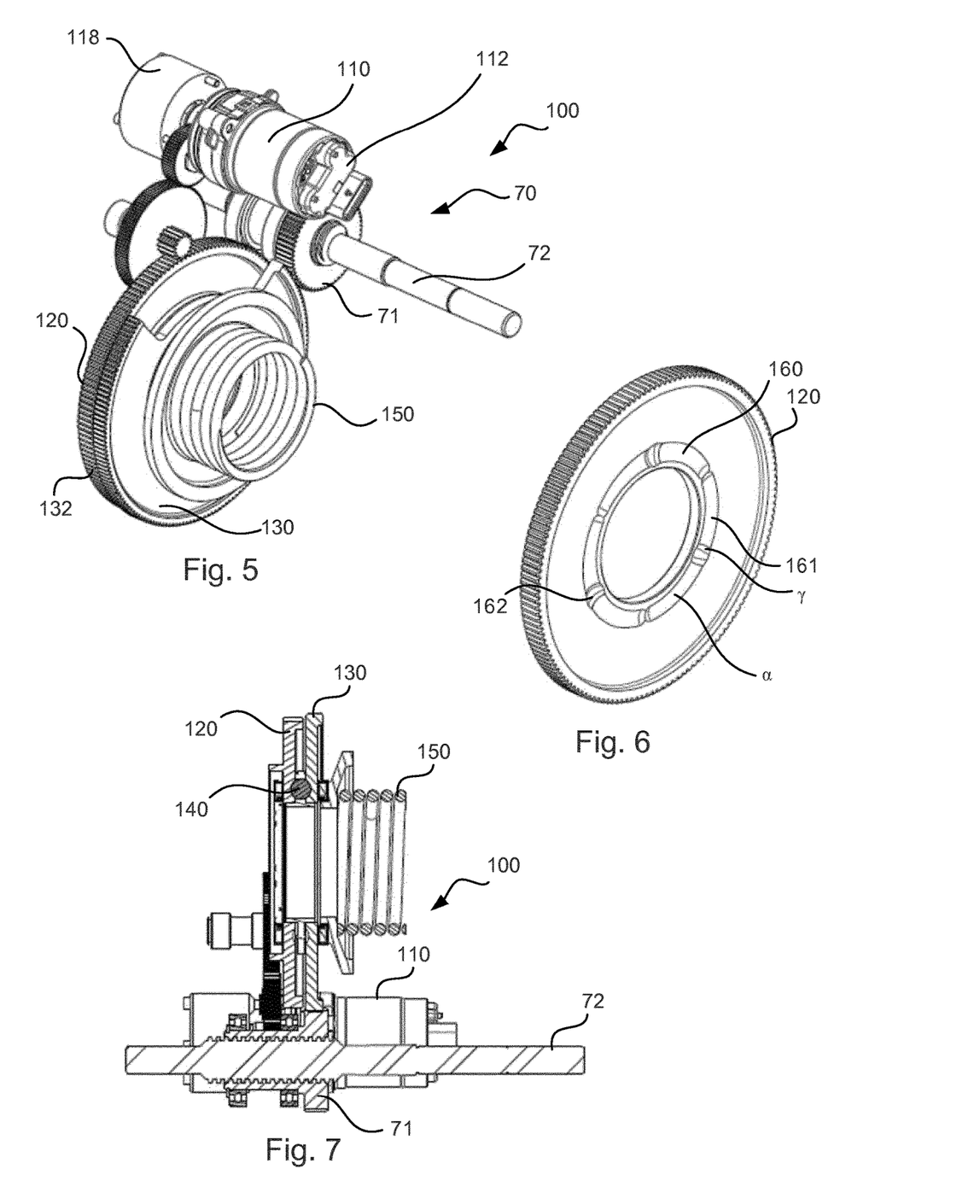
FIG. 5 is an isometric view of an actuator according to an embodiment.
FIG. 6 is an isometric view of a rotational member of the actuator shown in FIG. 5.
FIG. 7 is a cross-sectional view of the actuator shown in FIG. 5.

Rotational movement of the second rotational member 130 is achieved by the rotation of the first rotational member 120. More specifically, the cam surface 160, which is arranged in the first and/or the second rotational member 120, 130, is configured to, by the force from the spring 150 pressing the second rotational member 130 against the first rotational member 120, allow transfer of a torque from the first rotational member 120 to the second rotational member 130 via the rolling elements 140. There is however a limited torque that is possible to transfer before the first rotational member 120 and the second rotational member 130 starts to rotate in relation to one another. This torque level is dictated at least by the shape of the cam surface 160, the force of the return spring 150, and the shape, size and number of the rolling elements 140. Preferably, as seen in FIGS. 3 and 6, the cam surface 160 has a first inclination $\gamma$, being a larger inclination than a second inclination $\alpha$. The first inclination $\gamma$ is in the range of 20° to 30°, preferably approximately 23,5°, and the second inclination $\alpha$ is in the range 2° to 6°, preferably approximately 3,7°.

The first inclination $\gamma$, given that the other parameters are fixed, defines a threshold torque level which needs to be overcome for achieving relative rotation between the first and second rotational members 120, 130. Preferably the threshold is set such that a torque level, designated the second torque level, for relative rotation between the first rotational member 120 and the second rotational member 130 is between 55% and 75% of maximum torque from the electrical motor 110, or more preferred approximately 65%. When keeping the torque level below this, the first rotational member 120 and the second rotational member 130 will rotate as a unit given that the rolling members 140 are located on the cam surface 160 where they are subjected to the first inclination $\gamma$. In such case, typically between 30% and 50% of maximum torque from the electrical motor 110 is preferably used, or more preferred approximately 40%, from hereon designated a first torque level. Due to the inclination of the cam surface 160, the second rotational member 130 is biased for returning to an axial position where the coupling 40 is disconnected and the second rotational member 130 is as close to the first rotational member 120 as possible.

The inclinations mentioned above are preferably generated by the provision of a number of arc-shaped depressions 161 in the cam surface 160. The arc-shaped depressions 161 are preferably provided in the same number as the rolling elements 140, i.e. such that one rolling element 140 is arranged in each arc-shaped depression 161. An indentation 162 is also provided, preferably centrally, in each arc-shaped depression 161. The surface in the arc-shaped depressions 161 defines the second inclination $\alpha$ from the indentation 162 upwards (towards the first rotational member 120) with increasing distance away from the indentation 162 in each arc-shaped depression 161. The first inclination $\gamma$ is defined by the indentations 162 and is inclined upwards on each side in each indentation 162 towards the surface in the arc-shaped depressions 161. It is also to be noted that the cam surface 160 may be arranged in either of the first rotational member 120 and the second rotational member 130.

When the second rotational member 130 rotates, a nut 61, 71 of a switching mechanism 60, 70 rotates as well. In the embodiments shown in FIGS. 1 to 7, the switching mechanism 70 controls a gear ratio of a planetary gearing 73 between the input shaft 12 and the secondary output shaft 14. For instance, the switching mechanism 70 could thus control a high/low gear range selection of a vehicle. In one embodiment low range gear is selected by the nut 71 locking the ring wheel to the housing (the nut 71 moves to the right), while high range gear is selected by moving the nut 71 to the left, whereby the ring wheel will be locked to the planet carrier of the planetary gearing.

The switching mechanism 70 comprises a shifting fork 72, which is rotationally fixed but axially moveable as expected and transfers the force from the nut 71 to the gear selector of the planetary gearing 73. Thus a second functionality is provided by the actuator 100, as the switching mechanism 70 is actuated by the provision of the first torque level from the electrical motor 110 to the first rotational member 120.

The transfer case 10 may be provided with a electromechanical actuator 100, either as described with reference to FIGS. 2-4 or with reference to FIGS. 5-7. Although these embodiments show great similarities, they differ especially with regards to the electrical motor 110 used. The electrical motor 110 shown in FIG. 2 is a brush motor having a position sensor 112, as well as a solenoid brake 118 for enabling a park lock functionality. The electrical motor 110 of FIG. 5 is on the other hand a brushless motor having an ECU and a position sensor arranged thereon. Also for this motor a solenoid brake 118 is provided, in order to achieve parking brake functionality such as when power is turned off the all wheel drive is still in connected mode.

Figure 8:
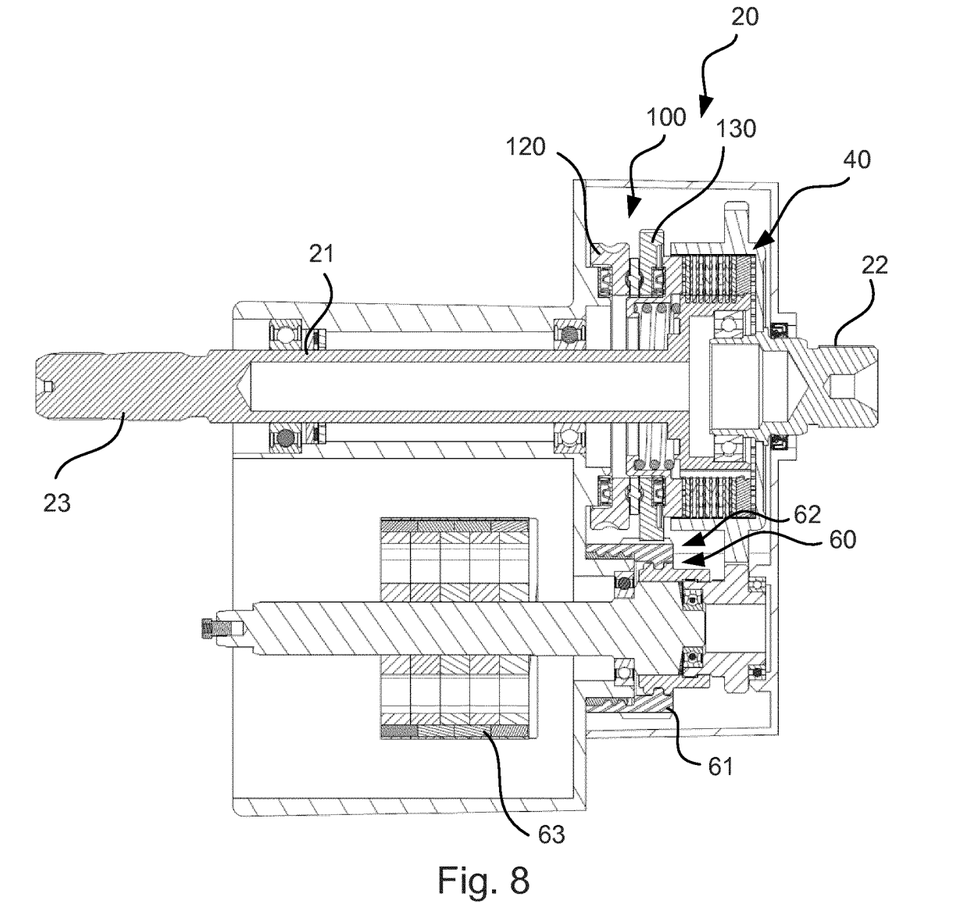
FIG. 8 is a cross-sectional view of an all wheel drive transmission according to one embodiment.
Figure 9:
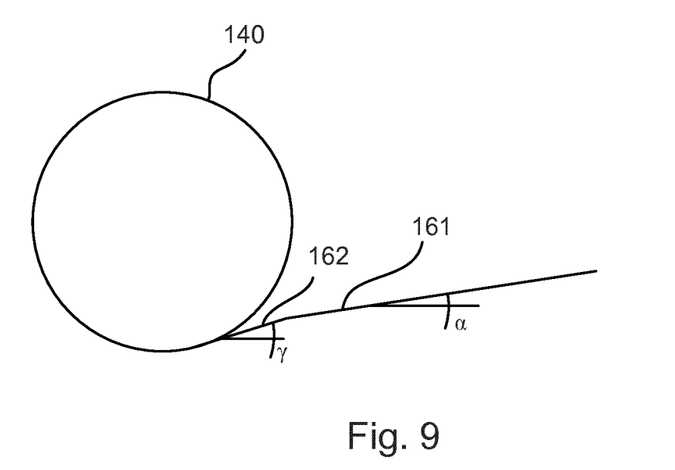
FIG. 9 is a schematic cross-sectional view of a rolling element on a cam surface of an actuator.

Now turning to FIG. 8 an AWD transmission 20 is shown. The AWD transmission 20 has an electrical drive motor 63 (not for actuating the actuator 100) in driving connection with a propeller shaft 21, at one end 22 connected to a transmission while the opposite end 23 is connected to the rear axle of the vehicle. The switching mechanism 60 comprises a nut 61 which is in engagement with the second rotational member 130. The nut 61 controls the axial motion of a dog clutch 62 which connects/disconnects the electrical motor 63 to the propeller shaft 21 via a coupling 40.

The second rotational member 130 comprises gear teeth 132 (see FIGS. 3 and 5) on its exterior circumference which are in engagement with gear teeth on a nut 61, 71 of the switching mechanism 70 (see FIG. 7) or of the disconnect clutch 60 (see FIG. 8). As is seen in FIG. 8, the electrical motor 63 may thereby be selectively connected/disconnected to the AWD transmission 20 by the actuation of the actuator 100. The electrical motor 63 is, when connected to the power train, providing additional torque to the vehicle, when necessary. As it is disconnectable, no energy will be wasted by unnecessary rotation of parts of the electrical motor 63. However, it is also possible to optionally connect the electrical motor 63 even when it is not providing power output to the power train, as it may be configured to function as a generator.

In all embodiments described herein, the actuator 100 is able to, by use of a single electrical motor 110 with a position sensor 112, not only control the actuation of the coupling 40, but also to control the switching mechanism 60, 70 which in turn provides a second functionality. As described, such dual functionality could be switching a gear ratio of an associated planetary gearing 73 or connecting/disconnecting an electric motor 63.

In order to provide a reliable control of the clutch actuator 50, the electric motor 110 is as mentioned provided with a position sensor 112. The position sensor 112 can detect the position of the rotor of the electric motor 110 and thereby it is possible to determine the position of the coupling 40, both regarding connection state as well as the position of the switching mechanism 60, 70. A single position sensor 112 is thus sufficient to determine both the AWD-state of the vehicle, as well as the position of the switching mechanism 60, 70 which could be a hybrid mode selection or a high/low range selection.

Figure 10:
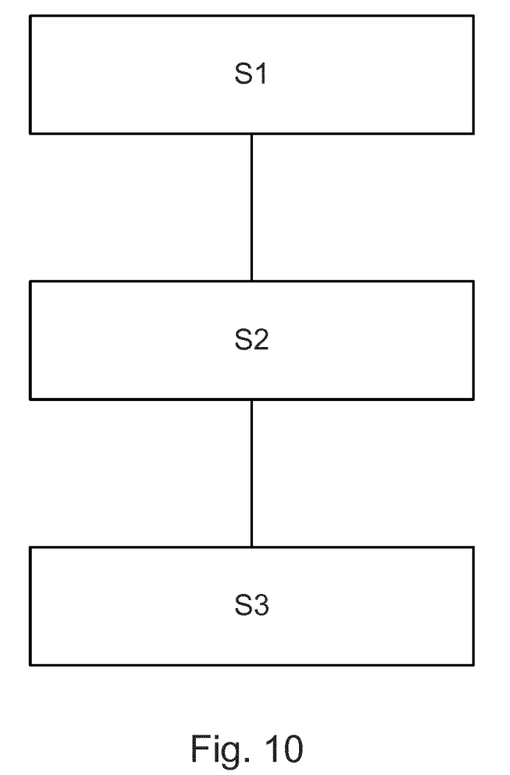
FIG. 10 shows a schematic outline of a method for controlling torque distribution in a vehicle according to one embodiment.

In FIG. 10, a schematic outline of a method for controlling an actuator 100 is shown. The method comprises the steps of receiving S1 an input of a desired AWD state of the vehicle and input of at least one second parameter corresponding the desired position of the switching mechanism 60. For instance, the current driving conditions may dictate that the vehicle should be in four wheel drive state and that low gear range is to be engaged or a hybrid mode activated. This could be decided autonomously by a control unit of the vehicle or by input from a user of the vehicle by manually selecting a preferred state. If the position sensor determines that the desired position, considering the desired state in S1 above, of the switching mechanism 60, 70 is other than the current position, the electric motor 110 applies S2 a first torque until the desired position is achieved. The switching mechanism 60, 70 is thus actuated by the actuator 100 rotating as a unit whereby the second rotational member 130 causes the nut 61, 71 to rotate. If the desired state of the vehicle above includes that AWD is desired, the electric motor applies S3 a second torque until AWD is achieved. As earlier mentioned, the second torque is larger than the first torque, which causes the first rotational member 120 and the second rotational member 130 to rotate in relation to one another. As this occurs, the cam surface 160 will cause the second rotational member 130 by its axial motion to rapidly engage the coupling 40 and connect the input shaft 12 with the secondary output shaft 14 of the coupling, thus engaging AWD. As explained earlier, after the first inclination γ is overcome by the rolling elements 140, the second inclination α of the cam surface 160 will cause further axial movement of the second rotational member 130 and thus further compression of the coupling 40. This provides an ability to control the amount of torque that is transferred through the coupling 40, i.e. providing a limited slip functionality thereto.

Figure 11:
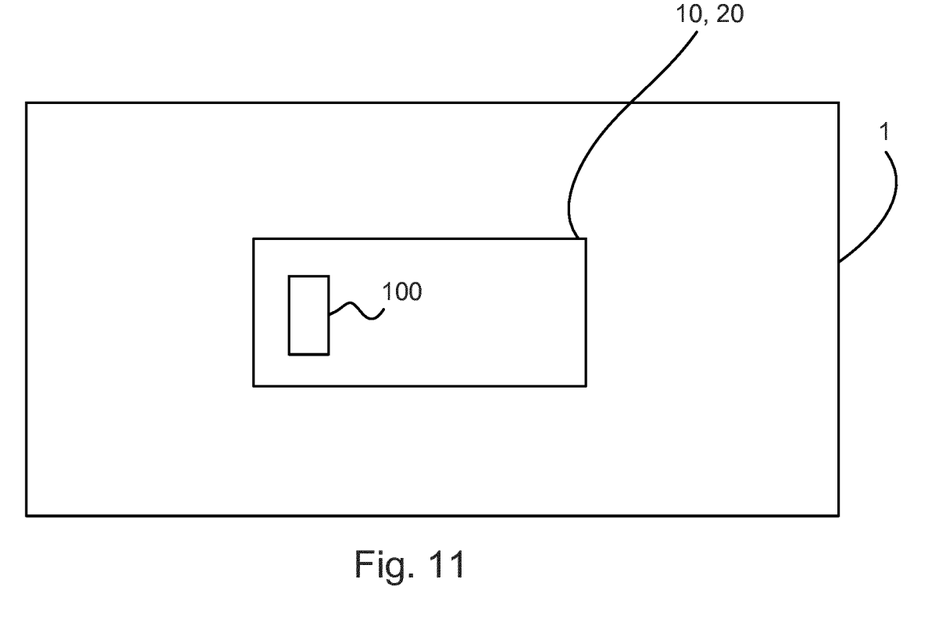
FIG. 11 shows a schematic outline of a vehicle comprising an actuator according to one embodiment.

FIG. 11 shows a schematic drawing of a vehicle 1, preferably a car, which comprises an actuator 100 for altering between AWD and two wheel drive, as well as switching a second function such as a low/high gear range and/or a connection/disconnection of an electric motor 63 to an AWD transmission.

It should be mentioned that the inventive concept is by no means limited to the embodiments described herein, and several modifications are feasible without departing from the scope of the invention as defined in the appended claims.

The invention claimed is:

1. An electromechanical actuator, comprising an electrical motor, a first rotational member being in driving connection with the electrical motor, a second rotational member being connected to the first rotational member by means of a plurality of rolling elements such that the first rotational member and the second rotational member together form a ball ramp mechanism, and a return spring pressing the first and second rotational members towards each other, wherein the ball ramp mechanism is configured to allow for mutual rotation of the first and second rotational member up to a first torque of the electrical motor, and to allow for axial separation of the first and second rotational members at a second torque of the electrical motor.

2. The electromechanical actuator according to claim 1, wherein the plurality of rolling elements are interposed between the first and second rotational members on a cam surface defined in at least one of the first or second rotational members.

3. The electromechanical actuator according to claim 2, wherein the cam surface comprises a number of arc shaped depressions, each having a first inclination angle, and a second inclination angle, wherein the first inclination angle is larger than the second inclination angle.

4. The electromechanical actuator according to claim 3, wherein an indentation is arranged centrally in each arc shaped depression, said indentation defining the first inclination from the indentation and up to the arc shaped depression, and wherein the second inclination is arranged in an upward direction on each side of the indentation.

5. The electromechanical actuator according to claim 4, wherein the first inclination is in a range of 20° to 30°.

6. The electromechanical actuator according to claim 5, wherein the first inclination angle is 23.5°, and wherein the second inclination angle is in a range of 2° to 6°.

7. The electromechanical actuator according to claim 6, wherein the second inclination angle is 3.7°.

8. The electromechanical actuator according to claim 1, wherein the electrical motor is in driving engagement with the first rotational member by means of spur gears.

9. The electromechanical actuator according to claim 8, wherein the electrical motor comprises a solenoid brake for maintaining a position of the first rotational member.

10. The electromechanical actuator according to claim 9, wherein the mutual rotation of the first and second rotational members is configured to control actuation of a disconnect clutch, and wherein the axial separation of the first and second rotational members is configured to control actuation of an all wheel drive clutch.

11. The electromechanical actuator according to claim 1, wherein the mutual rotation of the first and second rotational members is configured to control a position of a switching mechanism for altering a gear ratio or connecting or disconnecting a drive motor from a drive train, and wherein the axial separation of the first and second rotational members is configured to control actuation of an all wheel drive clutch.

12. The electromechanical actuator according to claim 11, wherein the second rotational member comprises gear teeth on its exterior circumference which are in engagement with gear teeth on a nut of the switching mechanism.

13. The electromechanical actuator according to claim 12, wherein the nut is axially moveable by rotation for controlling a position of the disconnect clutch.

14. The electromechanical actuator according to claim 12, wherein the nut controls an axial position of a shift fork.

15. The electromechanical actuator according to claim 11, wherein the return spring is arranged to bias the all wheel drive clutch into a disengaged state.

16. The electromechanical actuator according to claim 1, wherein the electrical motor is provided with a position sensor being configured to determine the position of the ball ramp mechanism.

17. The electromechanical actuator according to claim 1, wherein the second rotational member is driven to rotate only by a transfer of torque from the first rotational member to the second rotational member via the plurality of rolling elements.

18. A transfer case, comprising an all wheel drive clutch, a switching mechanism, and an electromechanical actuator comprising an electrical motor, a first rotational member being in driving connection with the electrical motor, a second rotational member being connected to the first rotational member by means of a plurality of rolling elements such that the first rotational member and the second rotational member together form a ball ramp mechanism, and a return spring pressing the first and second rotational members towards each other, wherein the ball ramp mechanism is configured to allow for mutual rotation of the first and second rotational member up to a first torque of the electrical motor, and to allow for axial separation of the first and second rotational members at a second torque of the electrical motor.

19. An all wheel drive transmission, comprising an electrical drive motor, an all wheel drive clutch, a disconnect clutch, and an electromechanical actuator comprising an electrical motor for the actuator, a first rotational member being in driving connection with the electrical motor for the actuator, a second rotational member being connected to the first rotational member by means of a plurality of rolling elements such that the first rotational member and the second rotational member together form a ball ramp mechanism, and a return spring pressing the first and second rotational members towards each other, wherein the ball ramp mechanism is configured to allow for mutual rotation of the first and second rotational member up to a first torque of the electrical motor for the actuator, and to allow for axial separation of the first and second rotational members at a second torque of the electrical motor for the actuator.

20. A vehicle comprising a transfer case comprising an all wheel drive clutch, a switching mechanism, and an electromechanical actuator comprising an electrical motor, a first rotational member being in driving connection with the electrical motor, a second rotational member being connected to the first rotational member by means of a plurality of rolling elements such that the first rotational member and the second rotational member together form a ball ramp mechanism, and a return spring pressing the first and second rotational members towards each other, wherein the ball ramp mechanism is configured to allow for mutual rotation of the first and second rotational member up to a first torque of the electrical motor, and to allow for axial separation of the first and second rotational members at a second torque of the electrical motor.

21. A method for controlling torque distribution in a vehicle by means of an electromechanical actuator comprising an electrical motor, a first rotational member being in driving connection with the electrical motor, a second rotational member being connected to the first rotational member by means of a plurality of rolling elements such that the first rotational member and the second rotational member together form a ball ramp mechanism, and a return spring pressing the first and second rotational members towards each other, wherein the ball ramp mechanism is configured to allow for mutual rotation of the first and second rotational member up to a first torque of the electrical motor, and to allow for axial separation of the first and second rotational members at a second torque of the electrical motor, said method comprising:

receiving, a first input of a desired all wheel drive state for the vehicle and a second input of a desired state of an associated switching mechanism, if the desired state of the switching mechanism is different from a current state, applying a first torque by the electrical motor until the desired state is achieved, and if all wheel drive is desired, applying a second torque by the electrical motor until all wheel drive is achieved, wherein the second torque is greater than the first torque.

22. The method according to claim 21, wherein the first torque is in a range of 30% to 50% percent of maximum motor torque, and wherein the second torque is in a range of 55% to 75% of maximum motor torque.

* * * * *